US012676659B2

(12) United States Patent
Raghavan et al.

(10) Patent No.: US 12,676,659 B2
(45) Date of Patent: Jul. 7, 2026

(54) SELECTION OF ADAPTIVE BEAM WEIGHTS FOR HYBRID BEAMFORMING AT MILLIMETER WAVE AND BEYOND FREQUENCIES

(71) Applicant: QUALCOMM Incorporated, San Diego, CA (US)

(72) Inventors: Vasanthan Raghavan, West Windsor Township, NJ (US); Sinan Adibelli, San Diego, CA (US); Yu-Chin Ou, San Diego, CA (US); Mohammad Ali Tassoudji, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 591 days.

(21) Appl. No.: 17/804,431

(22) Filed: May 27, 2022

(65) Prior Publication Data

US 2023/0412233 A1 Dec. 21, 2023

(51) Int. Cl.
| | |
|---|---|
| *H04B 7/06* | (2006.01) |
| *H04B 7/08* | (2006.01) |
| *H04B 17/309* | (2015.01) |

(52) U.S. Cl.
CPC ......... *H04B 7/0686* (2013.01); *H04B 7/0617* (2013.01); *H04B 7/084* (2013.01); *H04B 17/309* (2015.01)

(58) Field of Classification Search
CPC .. H04B 7/0686; H04B 7/0617; H04B 17/309; H04W 88/085
USPC ........................................................ 370/252
See application file for complete search history.

(56) References Cited

U.S. PATENT DOCUMENTS

| | | | | |
|---|---|---|---|---|
| 4,588,993 | A * | 5/1986 | Babij ........................ | H01Q 7/00 |
| | | | | 343/703 |
| 10,505,616 | B1 * | 12/2019 | Chen ..................... | H04B 7/0632 |
| 10,587,043 | B2 * | 3/2020 | Hwang ................ | H01Q 3/2611 |
| 11,336,319 | B2 * | 5/2022 | Badic .................... | H04W 72/51 |
| 11,646,761 | B2 * | 5/2023 | Shimura .............. | H04B 1/0483 |
| | | | | 343/702 |
| 2019/0115657 | A1 | 4/2019 | Hwang et al. | |
| 2020/0241306 | A1 | 7/2020 | Elaan et al. | |
| 2023/0088577 | A1 | 3/2023 | Raghavan et al. | |

(Continued)

FOREIGN PATENT DOCUMENTS

| | | | | |
|---|---|---|---|---|
| GB | 2455654 | A * | 6/2009 | ............... H01Q 1/36 |

OTHER PUBLICATIONS

Haddin et al., ("Impact of Phase-Shift Beamforming on Wideband Communications Systems", IEEE Xplore Dt: 2007) (Year: 2007).*

(Continued)

*Primary Examiner* — Christopher M Crutchfield
*Assistant Examiner* — Syed Ahmed
(74) *Attorney, Agent, or Firm* — Patterson & Sheridan LLP

(57) ABSTRACT

Certain aspects of the present disclosure provide techniques for wireless communications by a wireless device. The method generally includes determining a classification of electric field behavior of one or more antenna elements of the wireless device. The method generally includes selecting, based on the classification, between a phase-only beam weight control scheme and a phase and amplitude beam weight control scheme for hybrid beamforming using the one or more antenna elements.

29 Claims, 10 Drawing Sheets

700

A METHOD FOR WIRELESS COMMUNICATIONS BY A WIRELESS DEVICE

702
RECEIVE SIGNALING FROM A BASE STATION (BS) CONFIGURING A THRESHOLD

704
DETERMINE A CLASSIFICATION OF ELECTRIC FIELD BEHAVIOR OF ONE OR MORE ANTENNA ELEMENTS OF THE WIRELESS DEVICE

706
DETERMINE THE THRESHOLD BASED ON ONE OR MORE OF: A MOBILITY OF THE WIRELESS DEVICE, ONE OR MORE CAPABILITIES OF THE WIRELESS DEVICE, AN APPLICATION, A USE-CASE, A TYPE OF A COMMUNICATION FOR WHICH THE WIRELESS DEVICE PERFORMS THE HYBRID BEAMFORMING, OR A TARGET DATA RATE ASSOCIATED WITH THE COMMUNICATION

708
SELECT, BASED ON THE CLASSIFICATION, BETWEEN A PHASE-ONLY BEAM WEIGHT CONTROL SCHEME AND A PHASE AND AMPLITUDE BEAM WEIGHT CONTROL SCHEME FOR HYBRID BEAMFORMING USING THE ONE OR MORE ANTENNA ELEMENTS

710
SIGNAL AN INDICATION OF THE PHASE-ONLY BEAM WEIGHT CONTROL SCHEME OR THE PHASE AND AMPLITUDE BEAM WEIGHT CONTROL SCHEME BASED ON THE SELECTING

(56) References Cited

U.S. PATENT DOCUMENTS

2024/0372600 A1* 11/2024 Schreck .............. H04B 7/0456

OTHER PUBLICATIONS

Renjie Zhao et al. "M-Cube: A Millimeter-Wave Massive MIMO Software Radio", "26th Annual International Conference on Mobile Computing and Networking (MobiCom '20), Sep. 21-25, 2020, https://doi.org/10.1145/3372224.3380892" (Year: 2020).*

Xiangyu Gao et al. Title: "Towards Millimeter-Wave Radar Signal Processing and Learning-Based Applications" (Thesis Proposal, Department of Electrical and Computer Engineering, University of Washington, Seattle, WA 98195, Dec. 2021) (Year: 2021).*

Kenneth E. Kolodziej, et al, Title: "Adaptive Beamforming for Multi-Function In-Band Full-Duplex Applications", IEEE Wireless Communications • Feb. 2021; (Year: 2021).*

ETRI: "Initiai Views on MlMO/Beamforming in the NR Systems", 3GPP TSG RAN WG1 Meeting #85, R1-164872, 3rd Generation Partnership Project (3GPP), Mobile Competence Centre, 650, Route Des Lucioles, F-06921, Sophia-Antipolis Cedex, France, vol. RAN WG1, No. Nanjing, China, May 23, 2016-May 27, 2016, May 14, 2016, pp. 1-4, XP051089889, Section 3.

International Search Report and Written Opinion—PCT/US2023/067014—ISA/EPO—Aug. 11, 2023.

Wen C., et al., "Reconfigurable Sparse Array Synthesis With Phase-Only Control via Consensus-ADMM-Based Sparse Optimization", IEEE Transactions on Vehicular Technology, IEEE, USA, vol. 70, No. 7, Jun. 15, 2021, pp. 6647-6661, XP011867483, ISSN: 0018-9545, DOI: 10.1109/TVT.2021.3089418, [retrieved on Jul. 21, 2021], Section I.

* cited by examiner

500

| Classification | Difference in phase/amplitude over phase-only control scheme gains (50%) | Difference in phase/amplitude over phase-only control scheme gains (90%) |
|---|---|---|
| 0 mm air gap, 1 finger | 0.9 | 1.9 |
| 0 mm air gap, 2 fingers | 0.8 | 0.9 |
| 1 mm air gap, 1 finger | 0.9 | 1.75 |
| 1 mm air gap, 2 fingers | 0.6 | 1.2 |
| Wood, back mount | 0.1 | 0.8 |
| Wood, side mount | 0.1 | 0.9 |
| Metal, back mount, in-coverage | 0.6 | 1.0 |
| Metal, back mount, out-of-coverage | 0.5 | 1.4 |
| Metal, back mount, entire sphere | 0.5 | 1.2 |
| Metal, side mount, entire sphere | 0.3 | 1.1 |

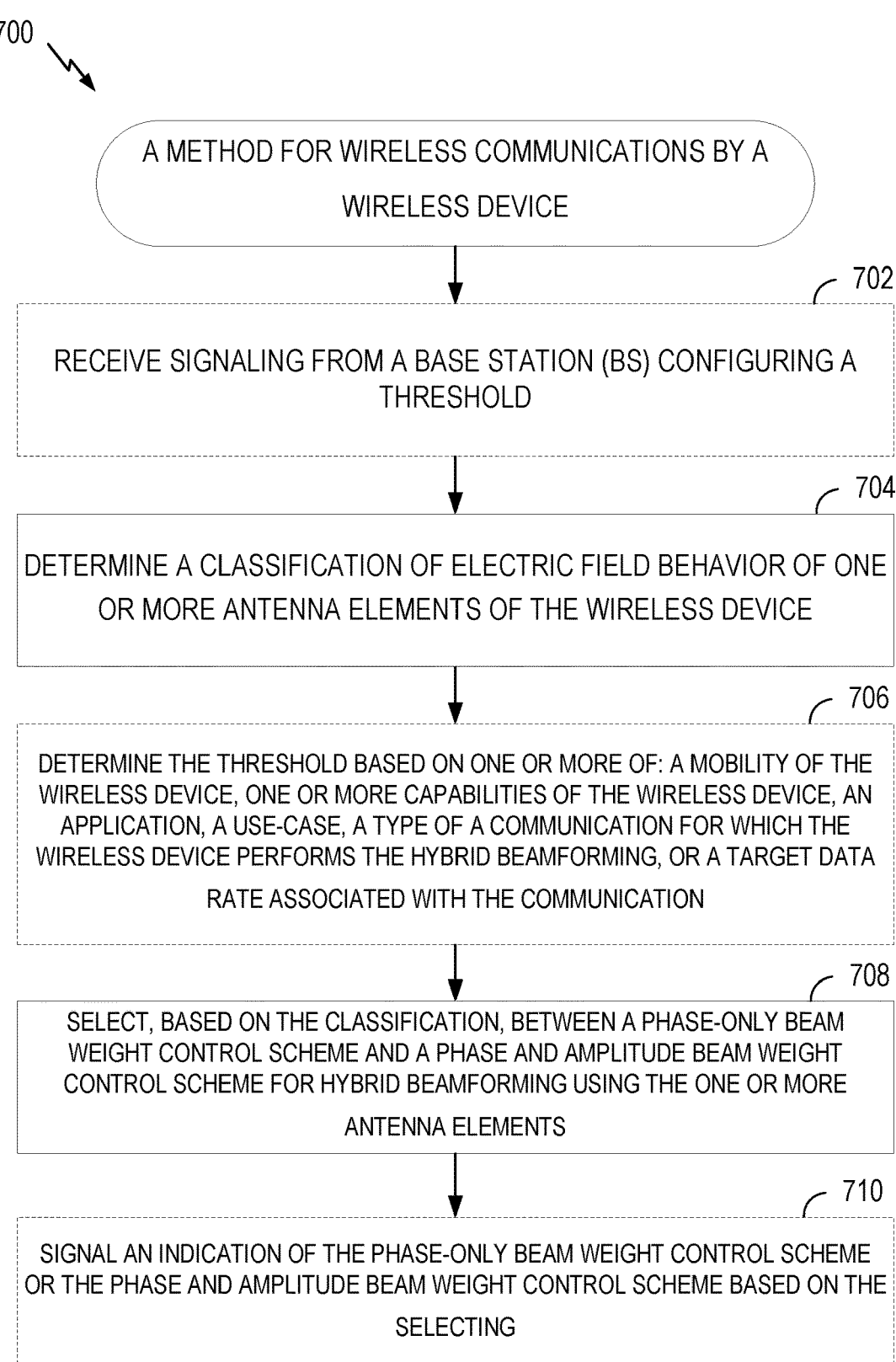

A METHOD FOR WIRELESS COMMUNICATIONS BY A WIRELESS DEVICE

702

RECEIVE SIGNALING FROM A BASE STATION (BS) CONFIGURING A THRESHOLD

704

DETERMINE A CLASSIFICATION OF ELECTRIC FIELD BEHAVIOR OF ONE OR MORE ANTENNA ELEMENTS OF THE WIRELESS DEVICE

706

DETERMINE THE THRESHOLD BASED ON ONE OR MORE OF: A MOBILITY OF THE WIRELESS DEVICE, ONE OR MORE CAPABILITIES OF THE WIRELESS DEVICE, AN APPLICATION, A USE-CASE, A TYPE OF A COMMUNICATION FOR WHICH THE WIRELESS DEVICE PERFORMS THE HYBRID BEAMFORMING, OR A TARGET DATA RATE ASSOCIATED WITH THE COMMUNICATION

708

SELECT, BASED ON THE CLASSIFICATION, BETWEEN A PHASE-ONLY BEAM WEIGHT CONTROL SCHEME AND A PHASE AND AMPLITUDE BEAM WEIGHT CONTROL SCHEME FOR HYBRID BEAMFORMING USING THE ONE OR MORE ANTENNA ELEMENTS

710

SIGNAL AN INDICATION OF THE PHASE-ONLY BEAM WEIGHT CONTROL SCHEME OR THE PHASE AND AMPLITUDE BEAM WEIGHT CONTROL SCHEME BASED ON THE SELECTING

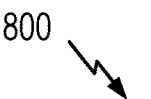

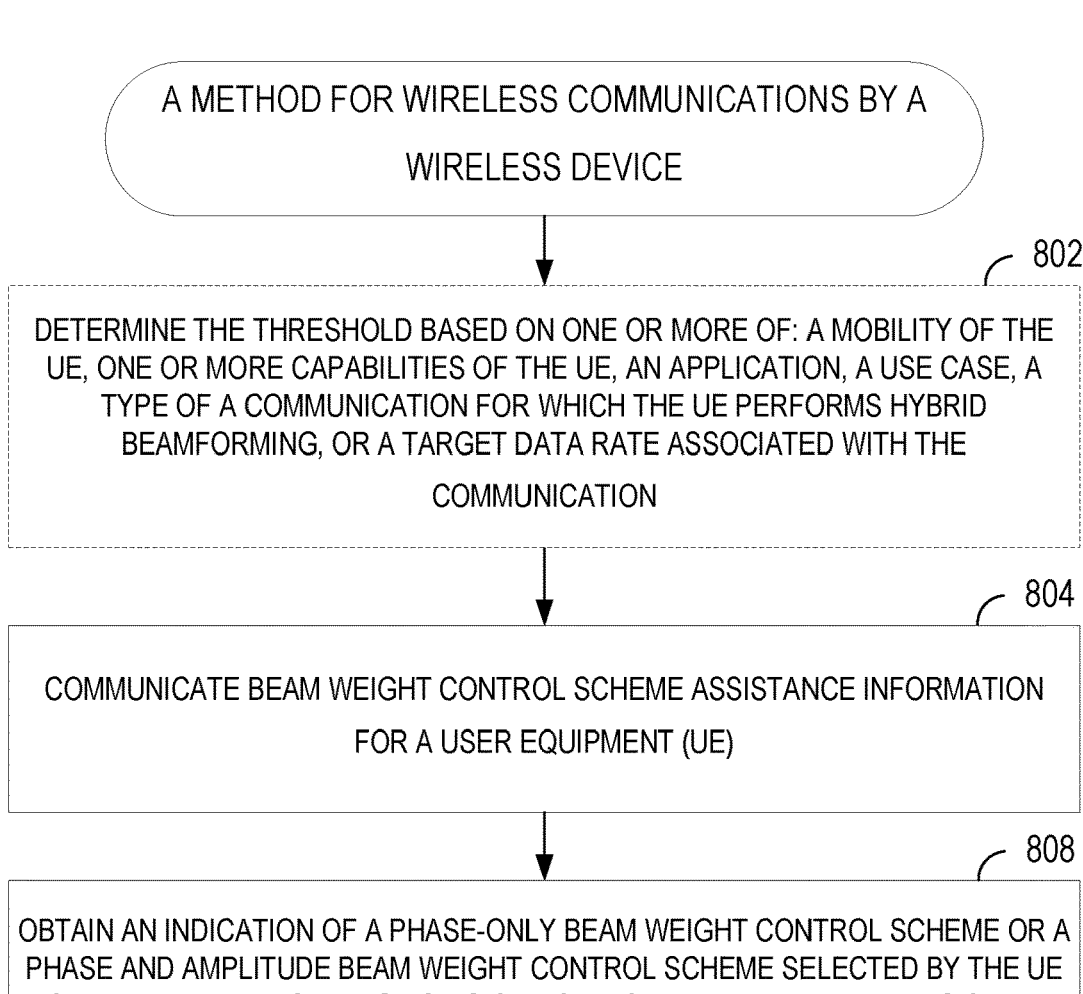

A METHOD FOR WIRELESS COMMUNICATIONS BY A WIRELESS DEVICE

802

DETERMINE THE THRESHOLD BASED ON ONE OR MORE OF: A MOBILITY OF THE UE, ONE OR MORE CAPABILITIES OF THE UE, AN APPLICATION, A USE CASE, A TYPE OF A COMMUNICATION FOR WHICH THE UE PERFORMS HYBRID BEAMFORMING, OR A TARGET DATA RATE ASSOCIATED WITH THE COMMUNICATION

804

COMMUNICATE BEAM WEIGHT CONTROL SCHEME ASSISTANCE INFORMATION FOR A USER EQUIPMENT (UE)

808

OBTAIN AN INDICATION OF A PHASE-ONLY BEAM WEIGHT CONTROL SCHEME OR A PHASE AND AMPLITUDE BEAM WEIGHT CONTROL SCHEME SELECTED BY THE UE FOR HYBRID BEAMFORMING USING ONE OR MORE ANTENNA ELEMENTS OF THE UE

FIG. 8

SELECTION OF ADAPTIVE BEAM WEIGHTS FOR HYBRID BEAMFORMING AT MILLIMETER WAVE AND BEYOND FREQUENCIES

BACKGROUND

Field of the Disclosure

Aspects of the present disclosure relate to wireless communications, and more particularly, to techniques for beamforming and beam weight selection in hybrid beamforming systems.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

A wireless communications network may use beamforming. Beamforming may use a static codebook stored in memory of a UE. The codebook includes a set of available antenna elements and beam weights for beam steering. A beam weight may correspond to a phase weight and an amplitude weight applied to an antenna element. The selection of the beam weights may be adaptive.

The phase-only control scheme, the phase values may be dynamically selected, but the amplitude values may all be the same. In a phase and amplitude beam weight control scheme, the antenna elements are controlled with a variable gain amplifier (VGA) in addition to the phase shifter and the amplifier values may be selected from a table (e.g., a look-up table (LUT)) including a uniformly or non-uniformly quantized set of amplitude values. There may be a tradeoff between complexity and gain between the different beam weight control schemes.

Accordingly, techniques are desirable for a device to dynamically select between beam weight control schemes for adaptive beam weight selection. In some examples, the device dynamically selects between a phase-only beam weight control scheme, and a phase and amplitude beam weight control scheme. The device may dynamically select the beam weight control scheme based on relative gains achieved by the beam weight control schemes. The device may dynamically select the beam weight control scheme further based on a use case and/or capabilities of the device.

One aspect provides a method for wireless communication by a wireless device. The method generally includes determining a classification of electric field behavior of one or more antenna elements of the wireless device. The method generally includes selecting, based on the classification, between a phase-only adaptive beam weight control scheme and a phase and amplitude adaptive beam weight control scheme for hybrid beamforming using the one or more antenna elements.

Another aspect provides a method for wireless communication by a wireless device. The method generally includes communicating the beam weight control scheme assistance information for a user equipment (UE). The method generally includes obtaining an indication of a phase-only beam weight control scheme or a phase and amplitude beam weight control scheme selected by the UE for hybrid beamforming using one or more antenna elements of the UE.

Other aspects provide: an apparatus operable, configured, or otherwise adapted to perform the aforementioned methods as well as those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIG. 5 is a table illustrating example difference in gains from a phase-only beam weight control scheme and a phase and amplitude beam weight control scheme.

FIG. 7 depicts a method for wireless communications.

FIG. 8 depicts another method for wireless communications.

DETAILED DESCRIPTION

Figure 1:
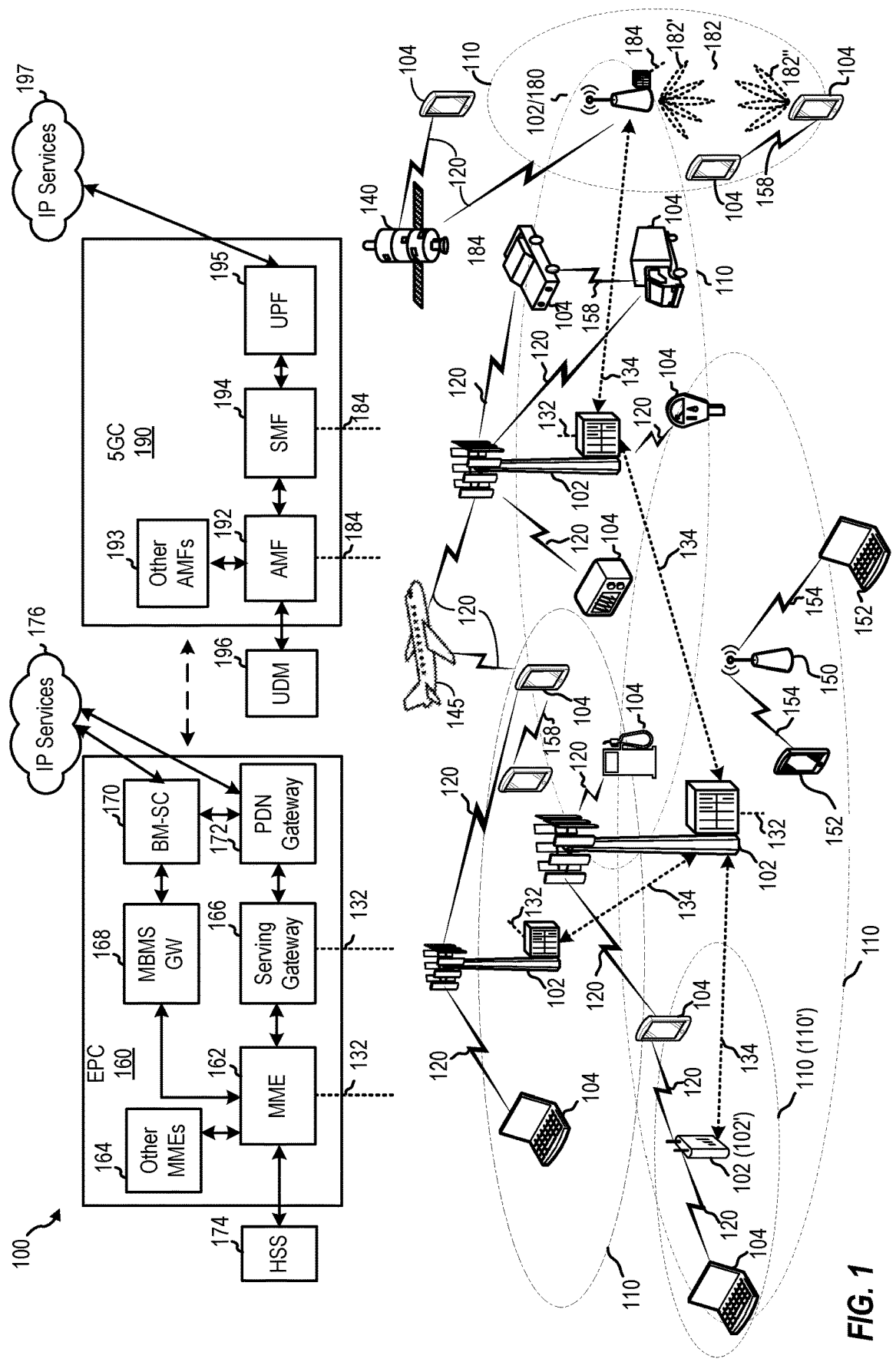
FIG. 1 depicts an example wireless communications network.

Aspects of the present disclosure provide apparatuses, methods, processing systems, and computer-readable mediums for dynamic selection of beam weights.

As discussed above, a wireless communications network may use beamforming. For example, beamforming may be used in a wireless communications network that operates in a radio frequency (RF) band in a sub-6 GHz range (FR1) or in a millimeter wave (mmWave) range (FR2) to compensate for path loss and improve coverage. Increased focus is on wireless communication in the upper mmWave range and sub-Terahertz range, including frequencies between 52.6 GHz and 114.25 GHz (e.g., FR4).

Unlike traditional antennas that transmit and receive only on fixed radiation patterns, beamforming antennas can be adapted to dynamically shape their main and null beam directions. When multiple antenna elements are mounted in a line along a shared reflector, the result is a panel antenna with linear arrays. A phased array antenna applies phase control (or time-delay) and/or amplitude control at each radiating element, so its beam can be shaped and scanned to different directions in space. By controlling the RF signal phases and amplitudes feeding the antenna elements, it is possible to dynamically shape the array factor and the overall radiated pattern. Array factor is a function of antenna positions in the array and the weights used. Thus, by tuning phase shifters to the antenna elements, the radiated pattern shape and direction can be controlled.

Beamforming achieves directional signal transmission and reception as well as power variation by amplitude and phase variation in beamforming system. Beamforming effectively reduces interference, improves signal-to-interference-and-noise ratio (SINR), and delivers a significantly better end user experience.

Beamforming techniques include analog beamforming, digital beamforming, and hybrid beamforming using directional beams to steer energy in specific directions of the beamspace.

Analog beamforming uses a single common radio frequency (RF) chain split among multiple antenna elements. The beam is controlled by adjusting analog phase shifters along the radio frequency path. In analog beamforming, amplitude/phase variation is applied to analog signal at the transmitter side. At the receiver side, the signals from different antennas are summed up before analog-to-digital conversion.

In digital beamforming, each antenna has a dedicated radio frequency signal and path. In digital beamforming, the signal is modulated by a set of precoding weights, propagated through the channel, and recovered by a set of combining weights. Phases and amplitudes are digitally controlled by baseband processing. Amplitude/phase variation is applied to the digital signal after analog-to-digital conversion at the transmitter side. At the receiver side, the received signals from antennas are first passed from ADCs and digital down converters before summation. Digital beamforming provides more beam control than analog beamforming; however, digital beamforming suffers high power consumption and signaling overheads.

Hybrid beamforming combines aspects of analog and digital beamforming. Precoding is applied to both the analog domain and digital domains. In a hybrid beamforming system, both the precoding weights and the combining weights are combinations of baseband digital weights and analog weights at the RF. The baseband digital weights convert the incoming data streams to input signals at each RF chain and the analog weights then convert the signal at each RF chain to the signal radiated or collected at each antenna element.

Beamforming may use a static codebook stored in memory of a UE (e.g., such as a UE 104) and a base station (e.g., such as a BS 102). The codebook may include a set of available antenna elements and beam weights for beam steering. A beam weight may correspond to a phase weight and an amplitude weight applied to an antenna element. With a static codebook, the beam weights are designed a priori. To select a beam, a wireless device may point beams in different directions from the static codebook to find the direction that provides the strongest signal strength at both the UE and BS sides.

According to certain aspects, the selection of the beam weights may be adaptive. With adaptive beam weight selection, the beam weights may be learned dynamically on-the-fly. Adaptive beam weight selection may use a much larger codebook than the static codebook and typically such codebooks cannot be easily stored in the radio frequency integrated circuit (RFIC) memory.

Adaptive beam weight selection may be useful as the communications environment may also be dynamic. For example, objects in the system may enter or leave the environment over time due to mobility. Further, a device may be mobile and the environment changes as the device moves. Objects in the wireless communications system may be referred to as a cluster in channel modeling parlance and the channel may include multiple viable clusters with good signal strengths. A cluster may include a reflector, a glass object, a metallic object, a scatterer, or other materials at millimeter wave and beyond carrier frequencies. A spectral response from a cluster may correspond to a radiation pattern. The radiation pattern includes lobes where the radiated signal strength reaches a maximum. The spectral response may include a main lobe and one or more side lobes. Side lobes are the local maxima of the far field radiation pattern of a radiation source that are not the main lobe. Side lobes may represent unwanted radiation in undesired directions that can cause interference in those directions to other users. There may be a balance between gain and side lobes. It may be desirable to increase the gain of a main radiation lobe while reducing the size of the side lobes.

Adaptive selection of beam weights may be useful for wide angular spreads within a cluster, multi-beam beam steering for multiple lobes across multiple clusters, side lobe control, and/or to avoid blockage of radio frequency signals, such as hand blockage, UE housing material, or other material blockages.

Adaptive beam weights can be selected according to different beam weight control schemes. Beams may be steered to any angle (0° to 360°). In a phase-only beam weight control scheme, antenna elements are controlled by a B-bit phase shifter. The 0° to 360° range may be partitioned into $2^B$ intervals. In the phase-only control scheme, the phase values may be dynamically selected, but the amplitude values may all be the same. In a phase and amplitude beam weight control scheme, the antenna elements are controlled with a variable gain amplifier (VGA) in addition to the phase shifter. The amplifier values may be selected from a table (e.g., a look-up table (LUT)) including a uniformly or non-uniformly quantized set of amplitude values.

There may be a tradeoff between complexity and gain between the different beam weight control schemes. For example, the phase-only beam weight control scheme may be relatively simple, while the phase and amplitude beam weight control scheme is more complex but provides more gains than the phase-only beam weight control scheme.

Some devices may have better hardware capability (e.g., range, accuracy, resolution capability, RFIC memory) and/or software capability for performing the phase and amplitude beam weight control scheme than other UEs having lesser capabilities. In addition, certain use cases may have more need for the higher gains provided by the phase and amplitude beam weight control scheme, such as due to a desire for higher data rates, timing requirements (e.g., backoff time needed for beam update over the bus from the modem to the RFIC), and the like.

Accordingly, techniques are desirable for a device (e.g., a UE) to dynamically select between beam weight control schemes for adaptive beam weight selection. In some examples, the device dynamically selects between a phase-only beam weight control scheme, and a phase and amplitude beam weight control scheme. The device may dynamically select the beam weight control scheme based on relative gains achieved by the beam weight control schemes. The device may dynamically select the beam weight control scheme further based on a use case and/or capabilities of the device.

According to certain aspects, the device dynamically selects the beam weight control scheme based on sensing of materials surrounding the device. In some examples, the device measures a spectral response from the material surrounding (e.g., within a near range) the device. The device may classify the measured spectral response. Based on the classification of the spectral response, the device may determine respective expected gains achieved by use of different beam weight control schemes for adaptive beam weight selection.

The device may select a beam weight control scheme based on the relative gains. In some examples, the device determines a difference between the amounts of expected gain achieved by the different beam weight control schemes, compares the difference to a threshold (e.g., a performance gap threshold), and dynamically selects a beam weight control scheme based on whether the difference exceeds the threshold. The selection may be further based on capabilities of the device, a type of transmission the beams are selected for, and/or one or more capabilities of the device.

According to certain aspects, the device signals the selected beam weight control scheme to another device (e.g., a BS).

Dynamic selection of the beam weight control scheme may allow a device to balance the costs and gains of various beam weight control schemes. For example, a UE may determine whether to select a phase and amplitude beam weight control scheme or select (or down-select) a phase-only beam weight control scheme based on whether the difference in the gain achieved using the more complex phase and amplitude beam weight control are sufficiently greater than the gain achieved using the simpler phase-only beam weight control scheme. The UE can further account for the capabilities of the UE and the use case scenario (e.g., whether the UE is stationary or mobile, a type of communications the UE is configured to perform) in determining whether the difference in the gains achieved (e.g., a performance gap threshold) sufficient to select the phase and amplitude beam weight control scheme.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
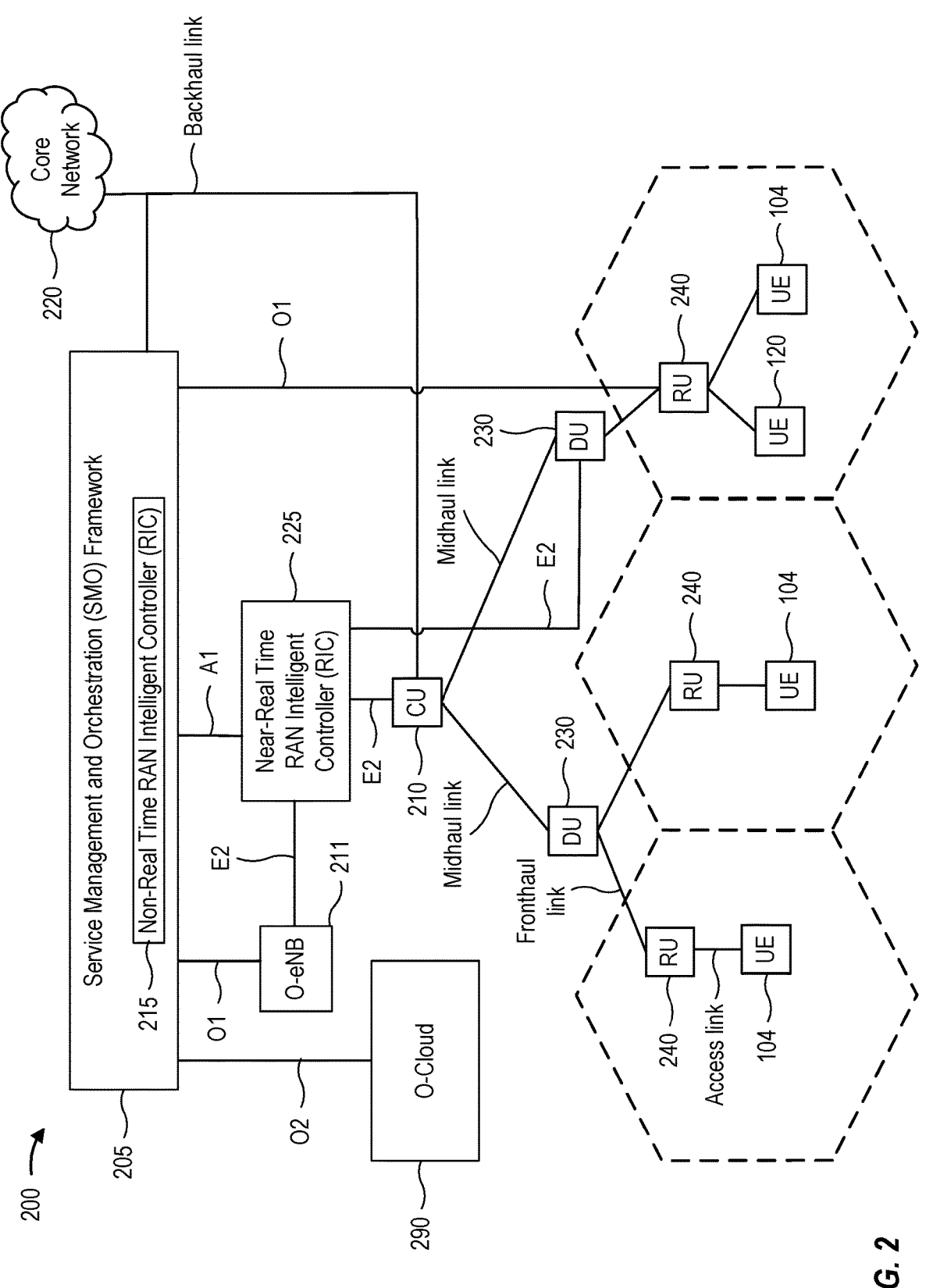
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) MC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (MC) 225 via an E2 link, or a Non-Real Time (Non-RT) MC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an AI interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
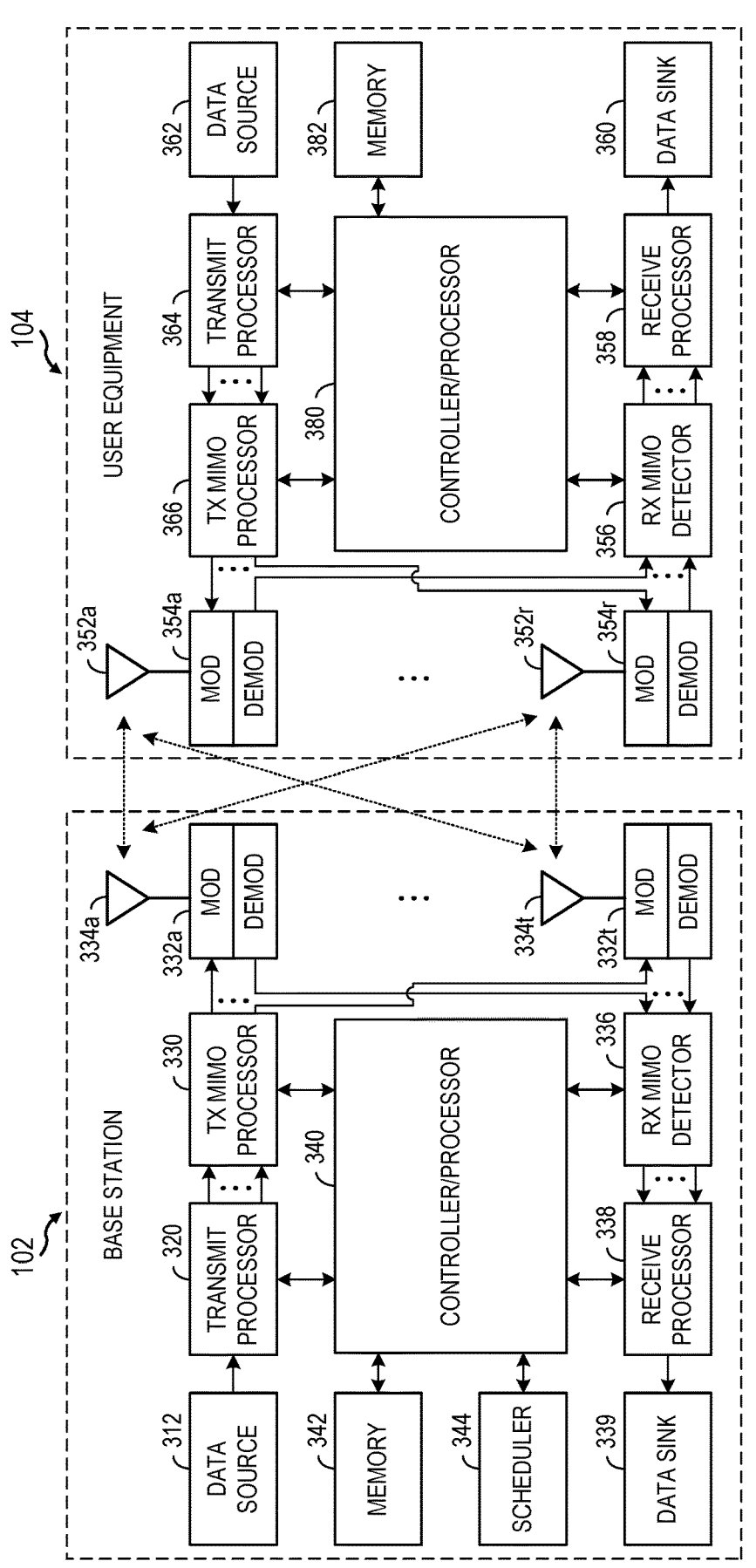
FIG. 3 depicts aspects of an example base station (BS) and an example user equipment (UE).

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figures 4A, 4B, 4C, 4D:
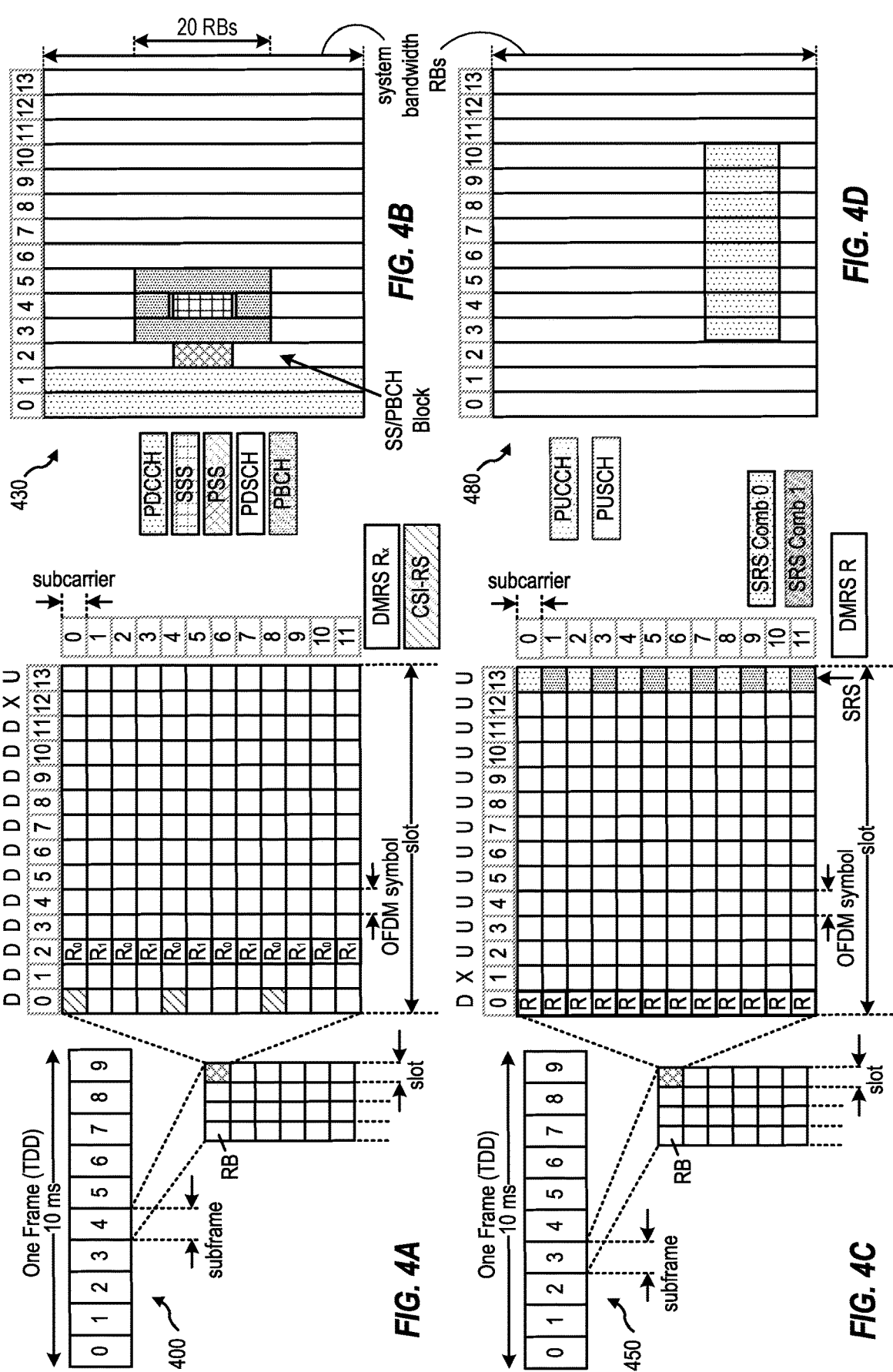
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $2\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Aspects Related to Adaptive Selection of Beam Weights

As discussed above, aspects of the present disclosure are related to adaptive beam weight selection. Aspects provide for dynamic selection of a beam weight control scheme for the adaptive beam weight selection. The adaptive beam weight selection may be used for analog and/or hybrid beamforming. According to certain aspects, the beam weight control scheme may be used for adaptive beam weight selection for uplink and/or downlink transmission and/or reception.

According to certain aspects, the dynamic selection of the beam weight control scheme is based on sensing of materials surrounding the device. Different materials around the UE lead to different effective electric field behaviors seen at the device's antenna elements. For example, different materials have different spectral responses resulting in different effective array gain at the device. Examples of materials surrounding a device may include a human hand holding the device or a human body near the device, an object the device is placed on (e.g., a table, a desk, or other surface), a protective case around the device, a protective screen cover on the device, a fabric/cloth when the device is placed in a pocket or a purse, or other materials near the device. Such materials may be comprised of skin (e.g., which is mostly water), plastic, glass, wood, metal, silicone, leather, or other materials. These materials have different conductive and dielectric properties with different electric field behaviors and spectral responses.

Table 500 in FIG. 5 illustrates example differences in signal-to-noise ratio (SNR) gains for different materials achieved by a phase-only beam weight control scheme and a phase and amplitude beam weight control scheme at a $50^{th}$ and $90^{th}$ percentile levels. That is, the gain distribution for at least 50 percentage of the scenarios and 90 percentage of the scenarios is indicated. As shown in the table 500, in general, more gains are seen with the amplitude and phase beam weight control scheme, relative to the phase-only beam weight control scheme, as the conductivity of the material increases. Scenarios include whether the antenna panel is back mounted on the device or whether the antenna panel is side mounted on the device. Another scenario includes whether the gain distribution is over an entire sphere around the device.

According to certain aspects, a device determines the surrounding material, or one or more electrical properties (e.g., the conductivity) of the surrounding material, in order to determine the expected gains (e.g., signal strength gains) achieved by the different beam weight control schemes.

In some examples, the device measures spectral responses from materials around the device. The device may measure within a range (e.g., within a few centimeters or millimeters). Based on the spectral responses, the device may estimate dielectric constant of a material surrounding the device or an effective dielectric constant of the materials surrounding the device.

In some examples, the device performs capacitive sensing, polarization sensing, radar sensing, or other reflectivity test to detect the material or materials (e.g., or properties of the materials) surrounding the device. Frequency-modulated continuous-wave (FMCW) radar sensing may be useful for measuring very small ranges (e.g., the measured range is comparable to the transmitted wavelength). With FMCW radar sensing, the device radiates continuous transmission power and the transmission signal is modulated in frequency (or in phase). With capacitive sensing, a capacitive sensor can detect a target or targets by emitting an electric field and detecting disruption to the electric field caused by the target(s).

According to certain aspects, the device may receive assistance information for the dynamic beam weight control scheme selection. The assistance information may include an indication of the material(s) surrounding the device. In some examples, a BS uses location information from multiple UEs to determine the assistance information and provides the assistance information to the device. According to certain aspects, the material(s) surrounding the device may be determined via a visual-aided approach. For example, a camera or sensor of the device can be used to detect material surrounding the device.

According to certain aspects, the detected spectral responses, measurements, properties, and/or materials are classified to map to expected gains from various beam weight control schemes. For example, the detected spectral responses, measurements, properties, and/or materials can be a priori labeled and trained using machine learning approaches to associate the detected spectral responses, measurements, properties, and/or materials with a classification. The classifications may be coarse or fine. In some examples, the detected spectral responses, measurements, properties, and/or materials can be associated with classifications using a non-machine learning approach.

According to certain aspects, the device may further determine a mode of operation. For example, a mode of operation may include whether the device is stationary or mobile, whether the device is being held, carried, or placed in a pocket or purse or whether the device is placed on a stationary surface such as on a desk or table, or other mode of operations. The mode of operation may include mobility information such as a velocity and/or direction that the device is moving. The mode of operation may be classified in addition to the detected spectral responses, measurements, properties, and/or materials.

According to certain aspects, the device determines a difference in gains achieved by the beam weight control schemes based on the classification. For example, the classifications can be a priori labeled and trained using machine learning to associate the classifications with expected gains achieved by the beam weight control schemes. In some examples, the classifications can be associated with the gains using a non-machine learning approach.

According to certain aspects, the device dynamically determines a beam weight control scheme based on the classification. In some examples, the various beam weight control schemes include a phase-only beam weight control scheme and a phase and amplitude beam weight control scheme. The phase-only beam weight control scheme may use only a phase shifter to control the phase per antenna element. The amplitudes may be the same per antenna element. The phase and amplitude beam weight control scheme may use the phase shifter to control the phase per antenna element and a VGA to control the amplitude per antenna element.

According to certain aspects, the device selects a beam weight control scheme based on a threshold signal strength (e.g., a minimum signal strength to be reached). The device may determine the threshold signal strength or the device may be configured by another device (e.g., a network entity) with the threshold strength. The threshold signal strength may be a target signal strength for a transmission using a beam weight control scheme. In some examples, the device may select the least complex beam weight control scheme that provides the threshold signal strength. For example, if the phase-only beam weight control scheme provides the threshold signal strength, then the device may select the phase-only beam weight control scheme. On the other hand, if the phase-only beam weight control scheme does not provide the threshold signal strength, then the device may select the phase and amplitude beam weight control scheme.

According to certain aspects, the device selects a beam weight control scheme based on a performance gap threshold. The device may determine the performance gap threshold or the device may be configured by another device (e.g., a network entity) or pre-configured (e.g., hard coded) with the performance gap threshold. The performance gap threshold may be a threshold difference in the gains achieved by the respective beam weight control schemes. In some examples, a network entity may semi-statically (e.g., via radio resource control (RRC) signaling) or dynamically (e.g., via downlink control information (DCI) or a medium access control-control element (MAC-CE)) configure the device with the performance gap threshold. If the device determines the difference in the expected gains from the phase and amplitude beam weight control scheme and the phase-only beam weight control scheme is at or exceeds the performance gap threshold, then the device may select the phase and amplitude beam weight control scheme. If the device determines the difference in the expected gains from the phase and amplitude beam weight control scheme and the phase-only beam weight control scheme is below the performance gap threshold, then the device may select the phase-only beam weight control scheme.

According to certain aspects, the device selects the beam weight control scheme further based on whether beam correspondence holds. Beam correspondence refers to a case where a channel conditions for uplink and downlink are similar and, therefore, a beam selected for downlink transmission and reception can be used (or can be derived for use) for uplink transmission and reception. In some examples, the device receives an indication of beam correspondence failure. The device may select different beam weight control schemes for uplink and downlink based on determining beam correspondence failure.

According to certain aspects, the device selects the beam weight control scheme further based on capabilities of the device. In some examples, the device may determine (or adjust) the performance gap threshold based on the capabilities of the device. For example, if the device has high capabilities, the device may use a lower performance gap threshold for selecting the phase and amplitude beam weight control scheme. If the device has lesser capabilities, the device may use a higher performance gap threshold for selecting the phase and amplitude beam weight control scheme.

According to certain aspects, the device selects the beam weight control scheme further based on a type of transmission for which the device uses the beam weight control scheme. In some examples, the device may determine (or adjust) the performance gap threshold based on the type of transmission. For example, if the device uses the beam weight control scheme for a type of transmission associated with a high data rate, the device may use a lower performance gap threshold for selecting the phase and amplitude beam weight control scheme. If the device uses the beam weight control scheme for a type of transmission associated with a lower data rate, the device may use a higher performance gap threshold for selecting the phase and amplitude beam weight control scheme.

According to certain aspects, the device signals information regarding the selected beam weight control scheme to another device (e.g., a network entity). In some examples, the device receiving the information may use the information to accommodate for potential beam correspondence failure issues. For example, a base station may use the information for power control. The base station may use a first power level when the UE uses a phase-only beam weight control scheme and may use a second power level when the UE uses a phase and amplitude beam weight control scheme.

According to certain aspects, the selection of the beam weight control scheme may be performed by a beam management controller of the device.

Example Operations of Entities in a Communications Network

Figure 6:
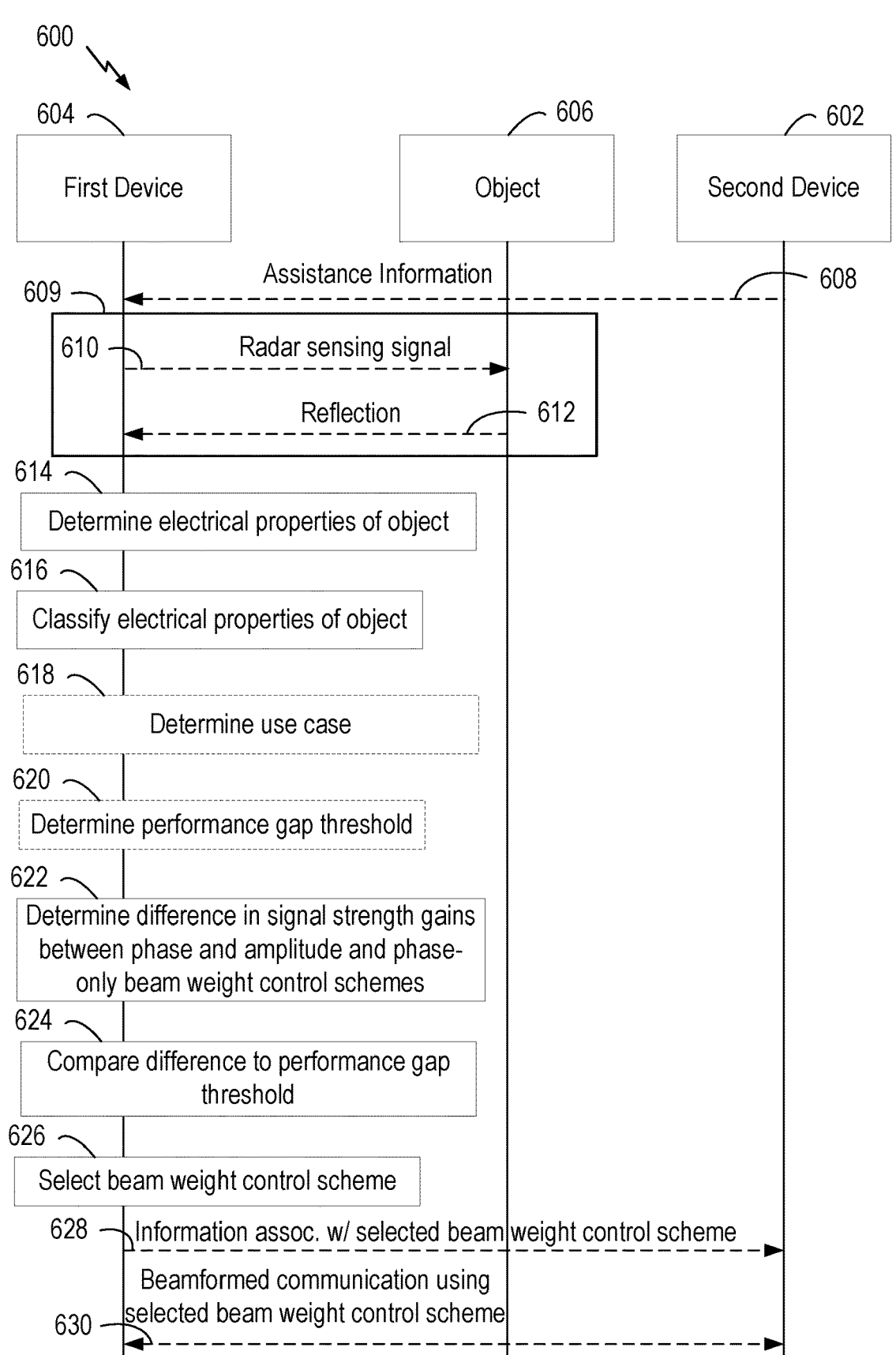
FIG. 6 depicts a process flow for communications in a network between a first device, a second device, and an object.

FIG. 6 depicts a process flow 600 for communications in a network between a first device 604, a second device 602, and an object 606. In some aspects, the second device 602 may be a network entity. The second device 602 may be an example of the BS 102 depicted and described with respect to FIGS. 1 and 3 or a disaggregated base station depicted and described with respect to FIG. 2. The first device 604 may be a user equipment. The first device 604 may be an example of UE 104 depicted and described with respect to FIGS. 1 and 3. However, in other aspects, UE 104 may be another type of wireless communications device and BS 102 may be another type of network entity or network node, such as those described herein. Object 606 may refer to multiple objects.

Optionally, at 608, first device 604 may receive assistance information from second device 602. The assistance information may be used by first device 604 in the selection of a beam weight control scheme at 626, which is described in more detail below. The assistance information may include information regarding one or more materials, electrical properties associated with the one or more materials, a beam weight control scheme associated with the one or more materials, an indication of beam correspondence failure, a performance gap threshold, a signal strength threshold, or other information.

Optionally, at 609, first device 604 performs sensing of one or more materials surrounding the first device 604. For example, at 610, first device 604 may transmit a radar sensing signal. At 612, first device 604 may receive a reflection of the radar sensing signal from object 606. It is noted that while radar sensing is illustrated as an example in FIG. 6, it should be understood that other types of sensing can be performed to detect materials surrounding first device 604. Further, in some examples, first device 604 may be informed of materials surrounding first device 604, such as in the assistance information from second device 602 received at 608.

At 614, first device 604 may determine one or more electrical properties of object 606 based on measurements of the reflection received at 612. For example, first device 604 may determine a level of distortion in the reflection received at 612 with respect to the radar sensing signal transmitted at 610. In some aspects, first device 604 may estimate an electrical conductivity property of object 606, such as a dielectric constant of object 606 based on the measurements of the reflection received at 612.

At 616, first device 604 classifies the electrical properties of object 606 (e.g., determined at 614). For example, first device 604 may have an association between ranges of values of electrical properties to classifications. In some examples, the classifications may be various material classifications. In some examples, the classifications may be a combination of material and use case scenarios. The association between the ranges of the values of electrical properties and the classifications may be in a mapping or a LUT stored at the first device 604. In some examples, the association may be based on machine learning. For example, first device 604 may input the values of the electrical properties to a predictive model that outputs a classification. The predict model may be generated using machine learning, for example, by training the model with various input electrical property values, predicting classifications, and updating the model based on the accuracy of the predictions.

Optionally, at 618, first device 604 may determine a use case. In some examples, the use case includes whether the first device 604 is stationary or mobile, a velocity and/or direction at which first device 604 is moving, one or more capabilities of first device 604, a type of communication for which the beamforming using the beam weight control scheme will be used (e.g., a target data rate for the communication), or other use case.

Optionally, at 620, first device 604 determines a performance gap threshold. In some examples, the performance gap threshold is configured at first device 604 by second device 602 (e.g., in the assistance information received at 608 or other signaling) or preconfigured at first device 604 (e.g., hardcoded). In some examples, first device 604 determines the performance gap threshold (or adjusts the configured performance gap threshold). For example, first device 604 may determine or adjust the performance gap threshold based on the use case determined at 618. As discussed herein, first device 604 may determine a lower performance gap threshold where the first device 604 has higher capabilities or a higher target data rate or a higher performance gap threshold where the first device 604 has lower capabilities or a lower target data rate.

At 622, first device 604 may determine a difference in gains (e.g., signal strength gains) between various beam weight control schemes (e.g., a phase-only beam weight control scheme and a phase and amplitude beam weight control scheme). For example, first device 604 may be configured with an association (e.g., a mapping or LUT) between the classifications and expected gains, or difference in gains, between the various beam weight control schemes.

At 624, first device 604 may compare the difference in gains between the beam weight control schemes to the performance gap threshold.

At 626, first device 604 selects a beam weight control scheme. For example, first device 604 may select between a phase-only beam weight control scheme and a phase and amplitude beam weight control scheme based on the comparison of the difference in gains to the performance gap threshold. First device 604 may select the phase-only beam weight control scheme when the difference in gains achieved by phase and amplitude beam weight control scheme and the phase-only beam weight control scheme is equal to or less than the performance gap threshold. First device 604 may select the phase and amplitude beam weight control scheme when the difference in gains achieved by phase and amplitude beam weight control scheme and the phase-only beam weight control scheme is greater than the performance gap threshold.

Optionally, at 628, first device 604 may signal information associated with the selected beam weight control scheme to second device 602.

Optionally, at 630, first device 604 communicates with second device 602 using the selected beam weight control scheme. For example, first device 604 may use the selected beam weight control scheme to adaptively select beam weights for transmitting and/or receiving beamformed signals.

Example Operations of a User Equipment

FIG. 7 shows a method 700 for wireless communications by a device. For example, the device may be a UE, such as UE 104 of FIGS. 1 and 3.

In one aspect, method 700 optionally includes, at 702, receiving signaling from a base station (BS) configuring the threshold.

In one aspect, method 700 optionally includes transmitting one or more sensing signals; measuring one or more reflection responses of the one or more sensing signals; and determining the electric field behavior based on the measuring the one or more reflection responses.

Method 700 begins at 704 with determining a classification of electric field behavior of one or more antenna elements of the wireless device. In one aspect, determining the classification of the electric field behavior of the one or more antenna elements of the wireless device, at 704, includes measuring one or more spectral responses of one or more materials within a range of the wireless device; and determining the classification of the electric field behavior based on a predefined association of a plurality of ranges of spectral responses to a plurality of classifications.

In one aspect, the plurality of classifications correspond to a plurality of materials. In one aspect, the plurality of classifications correspond to a plurality of combinations of materials, applications performed, or use cases at the wireless device.

In one aspect, determining the classification of the electric field behavior based on the predefined association of the plurality of ranges of spectral responses to the plurality of classifications includes communicating the one or more spectral responses to a predictive machine learning model; and obtaining one of the plurality of classifications from the predictive machine learning model as an output.

In one aspect, determining the classification of the electric field behavior based on the predefined association of the plurality of ranges of spectral responses to the plurality of classifications includes identifying a range, of the plurality of ranges, associated with the one or more spectral responses in a look-up table (LUT); and identifying a classification, of the plurality of classifications in the LUT, associated with the range.

In one aspect, the phase-only beam weight control scheme includes adaptively selecting a phase for each of the one or more antenna elements at a radio frequency (RF) carrier or an intermediate frequency (IF) carrier; and using a same amplitude level for each of one or more power amplifiers controlling the one or more antenna elements; and the phase and amplitude beam weight control scheme includes adaptively selecting a phase for each of the one or more antenna elements at the RF carrier or the IF carrier and an amplitude level for each of the one or more power amplifiers controlling the one or more antenna elements.

Method 700 then proceeds to step 708 with selecting, based on the classification, between a phase-only beam weight control scheme and a phase and amplitude beam weight control scheme for hybrid beamforming using the one or more antenna elements.

In one aspect, selecting, based on the classification, between the phase-only beam weight control scheme and the phase and amplitude beam weight control scheme for beamforming using the one or more antenna elements, at 708, includes determining a difference in signal quality gains between the phase and amplitude beam weight control scheme and the phase-only beam weight control scheme based on the classification; selecting the phase and amplitude beam weight control scheme when the difference in signal quality gains exceeds a threshold (e.g., the threshold received at 702 or a determined threshold); and selecting the phase-only beam weight control scheme when the difference in signal quality gains is equal to or less than the threshold.

In one aspect, determining the difference in signal quality gains between the phase and amplitude beam weight control scheme and the phase-only beam weight control scheme based on the classification includes communicating the classification to a predictive machine learning model; and obtaining a difference in signal quality gains from the predictive machine learning model as an output.

In one aspect, determining the difference in signal quality gains between the phase and amplitude beam weight control scheme and the phase-only beam weight control scheme based on the classification includes identifying the classification, of a plurality of classifications, in a look-up table (LUT); and identifying a difference in signal quality gains in the LUT associated with the classification.

In one aspect, the threshold is configured at the wireless device.

In one aspect, method 700 further includes determining the threshold based on one or more of: a mobility of the wireless device, one or more capabilities of the wireless device, an application, a use-case, a type of a communication for which the wireless device performs the hybrid beamforming, or a target data rate associated with the communication.

In one aspect, method 700 optionally includes, at 710, signaling an indication of the phase-only beam weight control scheme or the phase and amplitude beam weight control scheme based on the selecting.

Figure 9:
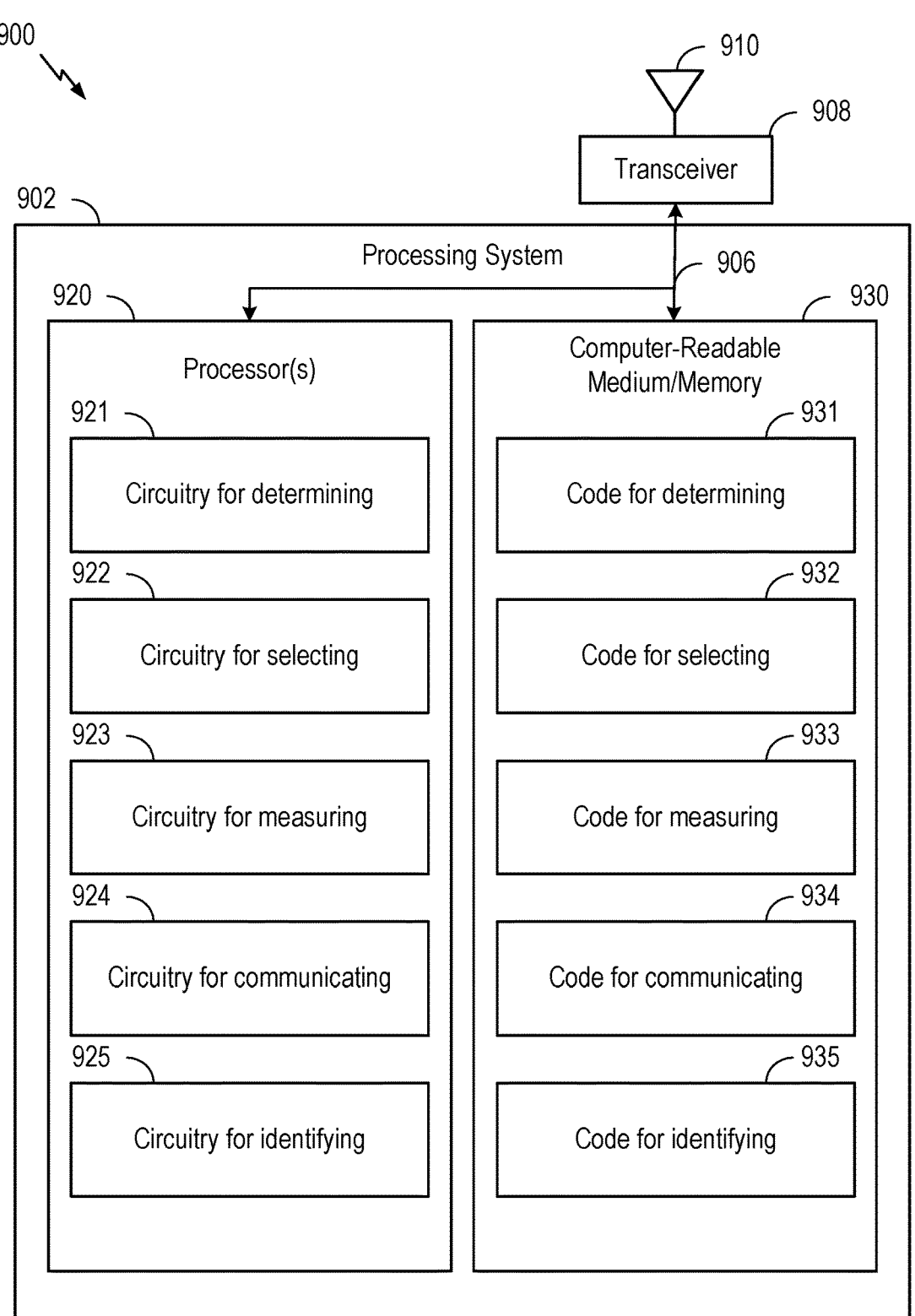
FIG. 9 depicts aspects of an example communications device.

In one aspect, method 700, or any aspect related to it, may be performed by an apparatus, such as communications device 900 of FIG. 9, which includes various components operable, configured, or adapted to perform the method 700. Communications device 900 is described below in further detail.

Note that FIG. 7 is just one example of a method, and other methods including fewer, additional, or alternative steps are possible consistent with this disclosure.

Example Operations of a Network Entity

FIG. 8 shows a method 800 for wireless communications by a device. The device may be a network entity, such as BS 102 of FIGS. 1 and 3, or a disaggregated base station as discussed with respect to FIG. 2.

In one aspect, method 800 optionally includes, at 802, determining the threshold based on one or more of: a mobility of the UE, one or more capabilities of the UE, an application, a use case, a type of a communication for which the UE performs hybrid beamforming, or a target data rate associated with the communication.

Method 800 begins at 804 with communicating beam weight control scheme assistance information for a user equipment (UE).

In one aspect, the beam weight control scheme assistance information includes at least one of: a plurality of classifications, a plurality of signal quality gains associated with a plurality of classifications of electric field behavior, a beam correspondence indication, or a combination thereof. In one aspect, the plurality of classifications correspond to a plurality of combinations of materials, applications, and use cases at the UE.

In one aspect, the beam weight control scheme assistance information comprises a predefined association of the plurality of ranges of spectral responses to the plurality of classifications. In one aspect the predefined association of the plurality of ranges of spectral responses to the plurality of classifications comprises a look-up table (LUT). In one aspect, the beam weight control scheme assistance information comprises a signal quality gains threshold.

In one aspect, the beam weight control scheme assistance information comprises a predefined association of the plurality of classifications to a plurality of signal quality gain values or difference in signal quality gain values. In one aspect, the predefined association of the plurality of classifications to a plurality of signal quality gain values or difference in signal quality gain values comprises a look-up table (LUT).

Method 800 then proceeds to step 804 with obtaining an indication of a phase-only beam weight control scheme or a phase and amplitude beam weight control scheme selected by the UE for hybrid beamforming using one or more antenna elements of the UE.

Figure 10:
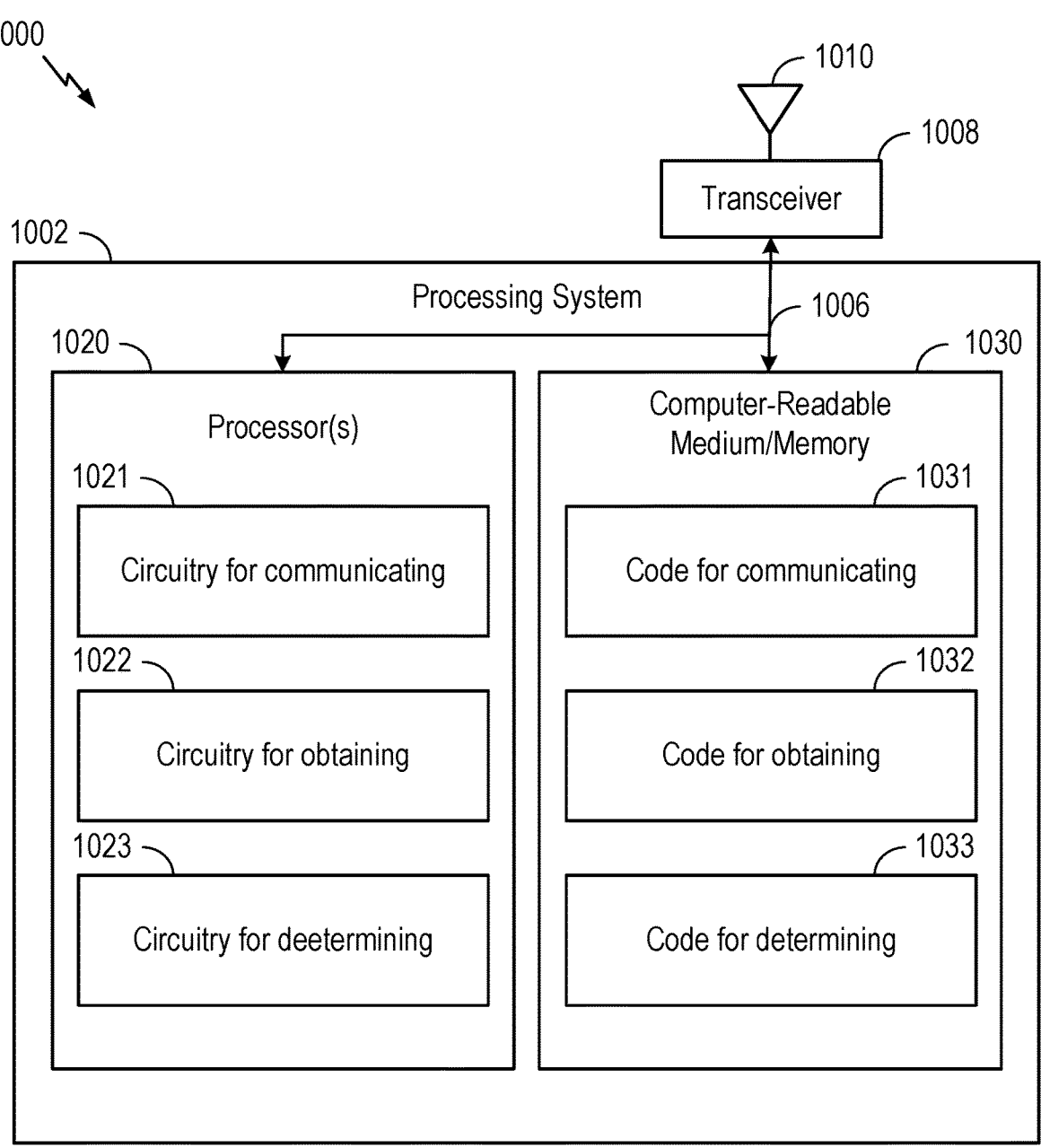
FIG. 10 depicts aspects of another example communications device.

In one aspect, method 800, or any aspect related to it, may be performed by an apparatus, such as communications device 1000 of FIG. 10, which includes various components operable, configured, or adapted to perform the method 800. Communications device 1000 is described below in further detail.

Note that FIG. 8 is just one example of a method, and other methods including fewer, additional, or alternative steps are possible consistent with this disclosure.

Example Communications Devices

FIG. 9 depicts aspects of an example communications device 900. In some aspects, communications device 900 is a user equipment, such as UE 104 described above with respect to FIGS. 1 and 3.

The communications device 900 includes a processing system 902 coupled to a transceiver 908 (e.g., a transmitter and/or a receiver). The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes one or more processors 920. In various aspects, the one or more processors 920 may be representative of one or more of receive processor 358, transmit processor 364, TX MIMO processor 366, and/or controller/processor 380, as described with respect to FIG. 3. The one or more processors 920 are coupled to a computer-readable medium/memory 930 via a bus 906. In certain aspects, the computer-readable medium/memory 930 is configured to store instructions (e.g., computer-executable code) that when executed by the one or more processors 920, cause the one or more processors 920 to perform the method 700 described with respect to FIG. 7, or any aspect related to it. Note that reference to a processor performing a function of communications device 900 may include one or more processors performing that function of communications device 900.

In the depicted example, computer-readable medium/memory 930 stores code (e.g., executable instructions) for determining 931, code for selecting 932, code for measuring 933, code for communicating 934, and code for identifying

23

935. Processing of the code 931-935 may cause the communications device 900 to perform the method 700 described with respect to FIG. 7, or any aspect related to it.

The one or more processors 920 include circuitry configured to implement (e.g., execute) the code stored in the computer-readable medium/memory 930, including circuitry for determining 921, circuitry for selecting 922, circuitry for measuring 923, circuitry for communicating 924, and circuitry for identifying 925. Processing with circuitry 921-925 may cause the communications device 900 to perform the method 700 described with respect to FIG. 7, or any aspect related to it.

Various components of the communications device 900 may provide means for performing the method 700 described with respect to FIG. 7, or any aspect related to it. For example, means for transmitting, sending or outputting for transmission may include the transceivers 354 and/or antenna(s) 352 of the UE 104 illustrated in FIG. 3 and/or transceiver 908 and antenna 910 of the communications device 900 in FIG. 9. Means for receiving or obtaining may include the transceivers 354 and/or antenna(s) 352 of the UE 104 illustrated in FIG. 3 and/or transceiver 908 and antenna 910 of the communications device 900 in FIG. 9.

FIG. 10 depicts aspects of an example communications device. In some aspects, communications device 1000 is a network entity, such as BS 102 of FIGS. 1 and 3, or a disaggregated base station as discussed with respect to FIG. 2.

The communications device 1000 includes a processing system 1002 coupled to a transceiver 1008 (e.g., a transmitter and/or a receiver) and/or a network interface 1012. The transceiver 1008 is configured to transmit and receive signals for the communications device 1000 via an antenna 1010, such as the various signals as described herein. The network interface 1012 is configured to obtain and send signals for the communications device 1000 via communications link(s), such as a backhaul link, midhaul link, and/or fronthaul link as described herein, such as with respect to FIG. 2. The processing system 1002 may be configured to perform processing functions for the communications device 1000, including processing signals received and/or to be transmitted by the communications device 1000.

The processing system 1002 includes one or more processors 1020. In various aspects, one or more processors 1020 may be representative of one or more of receive processor 338, transmit processor 320, TX MIMO processor 330, and/or controller/processor 340, as described with respect to FIG. 3. The one or more processors 1020 are coupled to a computer-readable medium/memory 1030 via a bus 1006. In certain aspects, the computer-readable medium/memory 1030 is configured to store instructions (e.g., computer-executable code) that when executed by the one or more processors 1020, cause the one or more processors 1020 to perform the method 800 described with respect to FIG. 8, or any aspect related to it. Note that reference to a processor of communications device 1000 performing a function may include one or more processors of communications device 1000 performing that function.

In the depicted example, the computer-readable medium/memory 1030 stores code (e.g., executable instructions) for communicating 1031, code for obtaining 1032, and code for determining 1033. Processing of the code 1031-1033 may cause the communications device 1000 to perform the method 800 described with respect to FIG. 8, or any aspect related to it.

The one or more processors 1020 include circuitry configured to implement (e.g., execute) the code stored in the computer-readable medium/memory 1030, including circuitry for communicating 1021, circuitry for obtaining 1022, and circuitry for determining 1023. Processing with circuitry 1021-1023 may cause the communications device 1000 to perform the method 800 as described with respect to FIG. 8, or any aspect related to it.

Various components of the communications device 1000 may provide means for performing the method 800 as described with respect to FIG. 8, or any aspect related to it. Means for transmitting, sending or outputting for transmission may include the transceivers 332 and/or antenna(s) 334 of the BS 102 illustrated in FIG. 3 and/or transceiver 1008 and antenna 1010 of the communications device 1000 in FIG. 10. Means for receiving or obtaining may include the transceivers 332 and/or antenna(s) 334 of the BS 102 illustrated in FIG. 3 and/or transceiver 1008 and antenna 1010 of the communications device 1000 in FIG. 10.

Example Clauses

Implementation examples are described in the following numbered clauses:

Clause 1: A method for wireless communications by a wireless device, the method comprising: determining a classification of electric field behavior of one or more antenna elements of the wireless device; and selecting, based on the classification, between a phase-only beam weight control scheme and a phase and amplitude beam weight control scheme for hybrid beamforming using the one or more antenna elements.

Clause 2: The method of clause 1, wherein determining the classification of the electric field behavior of the one or more antenna elements of the wireless device comprises: measuring one or more spectral responses of one or more materials within a range of the wireless device; and determining the classification of the electric field behavior based on a predefined association of a plurality of ranges of spectral responses to a plurality of classifications.

Clause 3: The method of clause 2, wherein the plurality of classifications correspond to a plurality of materials.

Clause 4: The method of any one or more of clauses 2-3, wherein the plurality of classifications correspond to a plurality of combinations of materials, applications performed, or use cases at the wireless device.

Clause 5: The method of any one or more of clauses 2-4, wherein determining the classification of the electric field behavior based on the predefined association of the plurality of ranges of spectral responses to the plurality of classifications comprises: communicating the one or more spectral responses to a predictive machine learning model; and obtaining one of the plurality of classifications from the predictive machine learning model as an output.

Clause 6: The method of any one or more of clauses 2-5, wherein determining the classification of the electric field behavior based on the predefined association of the plurality of ranges of spectral responses to the plurality of classifications comprises: identifying a range, of the plurality of ranges, associated with the one or more spectral responses in a look-up table (LUT); and identifying a classification, of the plurality of classifications in the LUT, associated with the range.

Clause 7: The method of any one or more of clauses 1-6, wherein: the phase-only beam weight control scheme comprises: adaptively selecting a phase for each of the one or more antenna elements at a radio frequency (RF)

carrier or an intermediate frequency (IF) carrier; and using a same amplitude level for each of one or more power amplifiers controlling the one or more antenna elements; and the phase and amplitude beam weight control scheme comprises: adaptively selecting a phase for each of the one or more antenna elements at the RF carrier or the IF carrier and an amplitude level for each of the one or more power amplifiers controlling the one or more antenna elements.

Clause 8: The method of any one or more of clauses 1-7, wherein selecting, based on the classification, between the phase-only beam weight control scheme and the phase and amplitude beam weight control scheme for beamforming using the one or more antenna elements comprises: determining a difference in signal quality gains between the phase and amplitude beam weight control scheme and the phase-only beam weight control scheme based on the classification; selecting the phase and amplitude beam weight control scheme when the difference in signal quality gains exceeds a threshold; and selecting the phase-only beam weight control scheme when the difference in signal quality gains is equal to or less than the threshold.

Clause 9: The method of clause 8, wherein determining the difference in signal quality gains between the phase and amplitude beam weight control scheme and the phase-only beam weight control scheme based on the classification comprises: communicating the classification to a predictive machine learning model; and obtaining the difference in signal quality gains from the predictive machine learning model as an output.

Clause 10: The method of any one or more of clauses 8-9, wherein determining the difference in signal quality gains between the phase and amplitude beam weight control scheme and the phase-only beam weight control scheme based on the classification comprises: identifying the classification, of a plurality of classifications, in a look-up table (LUT); and identifying the difference in signal quality gains in the LUT associated with the classification.

Clause 11: The method of any one or more of clauses 8-10, wherein the threshold is configured at the wireless device.

Clause 12: The method of any one or more of clauses 8-11, further comprising receiving signaling from a network entity configuring the threshold.

Clause 13: The method of any one or more of clauses 8-12, further comprising determining the threshold based on one or more of: a mobility of the wireless device, one or more capabilities of the wireless device, an application, a use-case, a type of a communication for which the wireless device performs the hybrid beamforming, or a target data rate associated with the communication.

Clause 14: The method of any one or more of clauses 1-13, further comprising: transmitting one or more sensing signals; measuring one or more reflection responses of the one or more sensing signals; and determining the electric field behavior based on the measuring the one or more reflection responses.

Clause 15: The method of any one or more of clauses 1-14, further comprising: signaling an indication of the phase-only beam weight control scheme or the phase and amplitude beam weight control scheme based on the selecting.

Clause 16: A method for wireless communications by a wireless device, the method comprising: communicating beam weight control scheme assistance information for a user equipment (UE); and obtaining an indication of a phase-only beam weight control scheme or a phase and amplitude beam weight control scheme selected by the UE for hybrid beamforming using one or more antenna elements of the UE.

Clause 17: The method of clause 16, wherein the beam weight control scheme assistance information comprises at least one of: a plurality of classifications, a plurality of signal quality gains associated with a plurality of classifications of electric field behavior, a beam correspondence indication, or a combination thereof Clause 18: The method of clause 17, wherein the plurality of classifications correspond to a plurality of combinations of materials, applications, and use cases at the UE.

Clause 19: The method of any one or more of clauses 17-18, wherein the beam weight control scheme assistance information comprises a predefined association of a plurality of ranges of spectral responses to the plurality of classifications.

Clause 20: The method of clause 19, wherein the predefined association of the plurality of ranges of spectral responses to the plurality of classifications comprises a look-up table (LUT).

Clause 21: The method of any one or more of clauses 17-20, wherein the beam weight control scheme assistance information comprises a signal quality gains threshold.

Clause 22: The method of clause 21, further comprising determining the signal quality gains threshold based on one or more of: a mobility of the UE, one or more capabilities of the UE, an application, a use case, a type of a communication for which the UE performs hybrid beamforming, or a target data rate associated with the communication.

Clause 23: The method of any one or more of clauses 17-22, wherein the beam weight control scheme assistance information comprises a predefined association of the plurality of classifications to a plurality of signal quality gain values or difference in signal quality gain values.

Clause 24: The method of clause 23, wherein the predefined association of the plurality of classifications to the plurality of signal quality gain values or difference in signal quality gain values comprises a look-up table (LUT).

Clause 25: An apparatus, comprising: a memory comprising executable instructions; and a processor configured to execute the executable instructions and cause the apparatus to perform a method in accordance with any one of Clauses 1-24.

Clause 26: An apparatus, comprising means for performing a method in accordance with any one of Clauses 1-24.

Clause 27: A non-transitory computer-readable medium comprising executable instructions that, when executed by a processor of an apparatus, cause the apparatus to perform a method in accordance with any one of Clauses 1-24.

Clause 28: A computer program product embodied on a computer-readable storage medium comprising code for performing a method in accordance with any one of Clauses 1-24.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus configured for wireless communications, the apparatus comprising:
    memory comprising computer-executable instructions; and
    one or more processor coupled with the memory and configured to, individually or collectively, execute the computer-executable instructions to cause the apparatus to:
        determine a classification of electric field behavior of one or more antenna elements of the apparatus;
        select, based on the classification, between a phase-only beam weight control scheme and a phase and amplitude beam weight control scheme for hybrid beamforming using the one or more antenna elements;
        signal, to a base station, an indication that the apparatus will use the selected phase-only beam weight control scheme or the selected phase and amplitude beam weight control scheme; and
        communicate with the base station using the selected phase-only beam weight control scheme or the selected phase and amplitude beam weight control scheme.

2. The apparatus of claim 1, wherein the one or more processors are configured to, individually or collectively, execute the computer-executable instructions to cause the apparatus to:
    measure one or more spectral responses of one or more materials within a range of the apparatus; and
    determine the classification of the electric field behavior of the one or more antenna elements based on a predefined association of a plurality of ranges of spectral responses to a plurality of classifications.

3. The apparatus of claim 2, wherein the plurality of classifications correspond to a plurality of materials.

4. The apparatus of claim 3, wherein the plurality of classifications correspond to a plurality of combinations of the plurality of materials and use cases of the apparatus.

5. The apparatus of claim 2, wherein the one or more processors are configured to, individually or collectively, execute the computer-executable instructions to cause the apparatus to:
    communicate the one or more spectral responses to a predictive machine-learning model; and
    obtain one of the plurality of classifications from the predictive machine-learning model as an output.

6. The apparatus of claim 2, wherein the one or more processors are configured to, individually or collectively, execute the computer-executable instructions to cause the apparatus to:

identify a range, of the plurality of ranges, associated with the one or more spectral responses in a look-up table (LUT); and identify a classification, of the plurality of classifications in the LUT, associated with the range.

7. The apparatus of claim 1, wherein:

the phase-only beam weight control scheme comprises:

adaptive selection of a phase for each of the one or more antenna elements at a radio frequency (RF) carrier or an intermediate frequency (IF) carrier; and use of a same amplitude level for each of one or more power amplifiers controlling the one or more antenna elements; and the phase and amplitude beam weight control scheme comprises:

adaptive selection of a phase for each of the one or more antenna elements at the RF carrier or the IF carrier; and adaptive selection of an amplitude level for each of the one or more power amplifiers controlling the one or more antenna elements.

8. The apparatus of claim 1, wherein the one or more processors are configured to, individually or collectively, execute the computer-executable instructions to cause the apparatus to:

determine a difference in signal quality gains between the phase and amplitude beam weight control scheme and the phase-only beam weight control scheme based on the classification;

select the phase and amplitude beam weight control scheme when the difference in signal quality gains exceeds a threshold; and select the phase-only beam weight control scheme when the difference in signal quality gains is equal to or less than the threshold.

9. The apparatus of claim 8, wherein the one or more processors are configured to, individually or collectively, execute the computer-executable instructions to cause the apparatus to:

communicate the classification to a predictive machine-learning model; and obtain the difference in signal quality gains from the predictive machine-learning model as an output.

10. The apparatus of claim 8, wherein the one or more processors are configured to, individually or collectively, execute the computer-executable instructions to cause the apparatus to:

identify the classification, of a plurality of classifications, in a look-up table (LUT); and identify the difference in signal quality gains in the LUT associated with the classification.

11. The apparatus of claim 8, wherein the threshold is configured at the apparatus.

12. The apparatus of claim 8, wherein the one or more processors are configured to, individually or collectively, execute the computer-executable instructions to cause the apparatus to:

receive signaling from a network entity configuring the threshold.

13. The apparatus of claim 8, wherein the one or more processors are configured to, individually or collectively, execute the computer-executable instructions to cause the apparatus to:

determine the threshold based on one or more of: a mobility of the apparatus, one or more capabilities of the apparatus, an application, a use-case, a type of a communication for which the apparatus performs the hybrid beamforming, or a target data rate associated with the communication.

14. The apparatus of claim 1, wherein the one or more processors are configured to, individually or collectively, execute the computer-executable instructions to cause the apparatus to:

transmit one or more sensing signals;

measure one or more reflection responses of the one or more sensing signals; and determine the electric field behavior of the one or more antenna elements based on the one or more reflection responses.

15. An apparatus configured for wireless communications, the apparatus comprising:

memory comprising computer-executable instructions; and one or more processors coupled with the memory and configured to, individually or collectively, execute the computer-executable instructions to cause the apparatus to:

communicate beam weight control scheme assistance information for a user equipment (UE);

obtain signaling from the UE indicating the UE will use a phase-only beam weight control scheme or a phase and amplitude beam weight control scheme for hybrid beamforming using one or more antenna elements of the UE; and communicate with the UE based on the indicated phase-only beam weight control scheme or the indicated phase and amplitude beam weight control scheme.

16. The apparatus of claim 15, wherein the beam weight control scheme assistance information comprises at least one of: a plurality of classifications, a plurality of signal quality gains associated with a plurality of classifications of electric field behavior, a beam correspondence indication, or a combination thereof.

17. The apparatus of claim 16, wherein the plurality of classifications correspond to a plurality of combinations of materials, applications, and use cases at the UE.

18. The apparatus of claim 16, wherein the beam weight control scheme assistance information comprises a predefined association of a plurality of ranges of spectral responses to the plurality of classifications.

19. The apparatus of claim 18, wherein the predefined association of the plurality of ranges of spectral responses to the plurality of classifications comprises a look-up table (LUT).

20. The apparatus of claim 16, wherein the beam weight control scheme assistance information comprises a signal quality gains threshold.

21. The apparatus of claim 20, wherein the one or more processors are configured to, individually or collectively, execute the computer-executable instructions to cause the apparatus to:

determine the signal quality gains threshold based on one or more of: a mobility of the UE, one or more capabilities of the UE, an application, a use case, a type of a communication for which the UE performs hybrid beamforming, or a target data rate associated with the communication.

22. The apparatus of claim 16, wherein the beam weight control scheme assistance information comprises a predefined association of the plurality of classifications to a plurality of signal quality gain values or difference in signal quality gain values.

23. The apparatus of claim 22, wherein the predefined association of the plurality of classifications to the plurality of signal quality gain values or difference in signal quality gain values comprises a look-up table (LUT).

24. A method for wireless communications by a wireless device, the method comprising:

determining a classification of electric field behavior of one or more antenna elements of the wireless device;

selecting, based on the classification, between a phase-only beam weight control scheme and a phase and amplitude beam weight control scheme for hybrid beamforming using the one or more antenna elements;

signal, to a base station, an indication that the wireless device will use the selected phase-only beam weight control scheme or the selected phase and amplitude beam weight control scheme; and communicating with the base station using the selected phase-only beam weight control scheme or the selected phase and amplitude beam weight control scheme.

25. The method of claim 24, wherein determining the classification of the electric field behavior of the one or more antenna elements comprises:

measuring one or more spectral responses of one or more materials within a range of the wireless device; and determining the classification of the electric field behavior of the one or more antenna elements based on a predefined association of a plurality of ranges of spectral responses to a plurality of classifications.

26. The method of claim 25, wherein the plurality of classifications correspond to a plurality of materials.

27. The method of claim 26, wherein the plurality of classifications correspond to a plurality of combinations of the plurality of materials and use cases of the wireless device.

28. The method of claim 25, wherein determining the classification of the electric field behavior of the one or more antenna elements based on the predefined association of the plurality of ranges of spectral responses to the plurality of classifications comprises:

communicating the one or more spectral responses to a predictive machine learning model; and obtaining one of the plurality of classifications from the predictive machine learning model as an output.

29. A method for wireless communications by a wireless device, the method comprising:

communicating beam weight control scheme assistance information for a user equipment (UE);

obtaining signaling from the UE indicating the UE will use a phase-only beam weight control scheme or a phase and amplitude beam weight control scheme for hybrid beamforming using one or more antenna elements of the UE; and communicating with the UE based on the indicated phase-only beam weight control scheme or the indicated phase and amplitude beam weight control scheme.

* * * * *